United States Patent [19]

Smallegan

[11] Patent Number: 4,505,416
[45] Date of Patent: Mar. 19, 1985

[54] FASTENER INSTALLATION APPARATUS

[75] Inventor: Jon M. Smallegan, Farmington Hills, Mich.

[73] Assignee: Multifastener Corporation, Southfield, Mich.

[21] Appl. No.: 397,757

[22] Filed: Jul. 13, 1982

[51] Int. Cl.³ .................... B21J 15/00; B23P 11/00
[52] U.S. Cl. ............................ 227/120; 29/432; 29/818; 227/107
[58] Field of Search ............ 29/432, 412, 798, 818; 206/338, 343; 227/2, 107, 120; 411/179

[56] References Cited

U.S. PATENT DOCUMENTS

| | | | |
|---|---|---|---|
| 2,750,660 | 6/1956 | Newcomb | 29/432 |
| 2,859,511 | 11/1958 | Gallagher et al. | 29/432 |
| 3,098,576 | 7/1963 | Steward | 227/2 |
| 3,108,368 | 10/1963 | Steward | 29/432 |
| 3,126,776 | 3/1964 | Whistler, Sr. et al. | 29/432 X |
| 4,153,989 | 5/1979 | Shinjo | 29/818 X |

Primary Examiner—Paul A. Bell
Attorney, Agent, or Firm—Cullen, Sloman, Cantor, Grauer, Scott & Rutherford

[57] ABSTRACT

A simplified reliable fastener installation apparatus or head assembly particularly suitable for installing self-attaching pierce or clinch nuts. The head assembly includes a stationary base plate for attachment to a die shoe and a mating relatively moveable member. The moveable member, which may be formed from a single block of metal, includes intersecting transverse passages, including a first passage receiving fasteners for installation and a plunger passage. The head portion of a T-shaped plunger is retained by the base plate and the plunger leg portion is telescopically received in the plunger passage of the moveable member. The moveable member is retained to the stationary member, stabilized and guided by guide bolts which are threadably attached to the base member and parallel to and spaced equidistant from the plunger.

8 Claims, 5 Drawing Figures

FASTENER INSTALLATION APPARATUS

FIELD OF THE INVENTION

This invention relates to a fastener installation apparatus having a reciprocating plunger, which is particularly suitable for installing self-attaching fasteners, such as pierce and clinch nuts. More specifically, the present invention relates to installation heads for pierce and clinch nuts of simple, rugged design.

DESCRIPTION OF THE PRIOR ART

The fastener installation head of this invention is particularly, although not exclusively, designed for self-piercing fasteners or pierce nuts, such as disclosed in U.S. Pat. No. 3,648,747, assigned to the assignee of the instant application. The pierce nut disclosed in said patent includes a rectangular pilot which pierces an opening in a panel, a pair of flanges on opposed sides of the pilot having panel bearing faces spaced below the pilot and re-entrant grooves in the flange bearing surfaces, on opposed sides of the pilot. Upon forced engagement with the panel, the pilot pierces an opening in the panel and the pierced panel edges are deformed into and retained by the re-entrant grooves. The pierce nuts may be interconnected by frangible connector means, as shown in U.S. Pat. No. 3,845,860, assigned to the assignee of the instant application, or in bulk form. The installation apparatus of this invention may also be used to install the generally T-shaped pierce nuts as disclosed in U.S. Pat. No. 3,152,628, or clinch nuts as disclosed in U.S. Pat. No. 2,750,660; both patents are assigned to the assignee of the instant application.

Installation heads for pierce and clinch nuts generally include telescopic housing members, which are relatively complex in design and machined from metal castings. The telescopic portions of the housing members provide support and guidance for the reciprocating or moveable housing member, as shown in U.S. Pat. Nos. 3,098,576 and 3,108,368, both of which are assigned to the assignee of the instant application. As shown, in the above referenced patents, the housing assembly includes several components, including a fixed housing member which supports and retains the plunger and a relatively moveable housing assembly which includes a separate nose piece and a feeder tongue assembly. The feeder tongue assembly includes a passage which receives the pierce nuts and which communicates with a coaxially aligned passage in the nose piece. The nose piece includes a plunger passage which telescopically receives the end of the plunger for installation of pierce nuts received from the tongue assembly, beneath the plunger. The separate moveable housing member supports and guides the nose piece and tongue assembly during installation of a nut.

More recently, pierce nut installation heads include a positive feed mechanism located within the telescopic housing assembly, as disclosed in U.S. Pat. No. 3,969,808. The positive feed mechanism includes a feed pawl, which is driven by a linkage, interconnected between the telescopic housing members, which feeds a pierce nut beneath the plunger upon each stroke of the press. All of the above referenced patents are assigned to the assignee of the instant application and are incorporated herein by reference.

Pierce nut installation heads are generally incorporated in a die press assembly, wherein the pierce nut is installed in a panel and the panel may be simultaneously formed by the die press. The stationary housing member is attached to a die shoe, platten or die member and the panel is supported on a piercing or clinching die located in the die press assembly opposite the plunger passage of the nose piece. Upon relative movement of the die press assembly, the nose piece engages the panel and collapses the telescopic housing assembly. The plunger engages a nut received through the nut passages to install the nut in the panel, as described in the above referenced patents.

The pierce nut installation head assemblies disclosed in the prior art are relatively complex, expensive and subject to failure. There is a need, therefore, for a simple, rugged pierce nut installation head assembly, as disclosed herein.

SUMMARY OF THE INVENTION

As described above, the installation apparatus or head assembly of this invention is adapted for installing self-attaching fasteners, particularly self-piercing fasteners, such as pierce nuts and clinch nuts. The apparatus includes a stationary member for attachment to a die shoe or member and a relatively moveable member. The moveable member includes a first passage for receiving the pierce nuts or self-attaching fasteners and a transverse plunger passage intersecting the first passage. A plunger is connected to the stationary member and projects into the plunger passage of the moveable member, in telescopic relation. A spring means, such as a conventional coil spring, is resiliently biased between the stationary and moveable members and normally separates the moveable member from the stationary member. In the preferred embodiment of this invention, the moveable member is supported for movement and guided by elongated guide members which are parallel to and spaced equidistant from the plunger. In the disclosed embodiment, the guide members are bolts which are received in parallel coaxially aligned bores in the moveable and stationary members. The ends of the bolts are threadably fastened to the stationary member and the bolts include an enlarged head portion disposed in counterbores in the moveable member, permitting limited movement of the moveable member, relative to the stationary member for installation of the pierce nut as described above. Briefly, self-attaching fasteners or pierce nuts are received in the first passage in the moveable member, beneath the plunger in the plunger passage. When the moveable member engages a panel supported on a pierce or clinch die, as described above, the moveable member is moved toward the stationary member, telescoping the plunger in the plunger passage and installing a fastener in the panel.

In the simplified, rugged design of the preferred embodiment of this invention, the stationary or base member may be a metal plate having an opening or slot which receives or retains the end of the plunger. The plunger is preferably T-shaped and integrally formed from a single piece of metal. The head portion is received in an opening or slot in the stationary base member and the leg portion projects into the plunger passage of the moveable member in telescopic relation.

The moveable member of the installation head is preferably formed from a single block of metal having perpendicular intersecting passages, as described above. The guide bolts are received in counterbores in the moveable member and threadably bolted to the stationary member through spaced parallel coaxially aligned bores. As described, the guide bolts are parallel to and equidistant from the axis of the plunger, permitting limited movement of the moveable member, relative to the stationary base plate, against the compression of the spring.

The simplified head assembly of this invention may be generally wedge-shaped, having a reduced width at the plunger for receipt of the working portion of the head in a tight location. The width of the apparatus spaced from the plunger is wider to accommodate the spaced guide bolts. In the preferred embodiment, the axes of the guide bolts are spaced approximately equidistant from each other and the axis of the plunger, defining an equilateral triangle and providing good support for movement of the plunger in the plunger passage.

The installation apparatus or head assembly of this invention is therefore relatively simple, yet rugged in construction. Further, the head assembly may be made very small and compact, compared to conventional pierce nut installation heads having the complex telescopic construction described hereinabove. Other advantages and meritorious features of the present invention will be more fully understood from the following description of the preferred embodiments, the appended claims and the drawings, a brief description of which follows.

DESCRIPTION OF THE PREFERRED EMBODIMENTS

Figure 1:
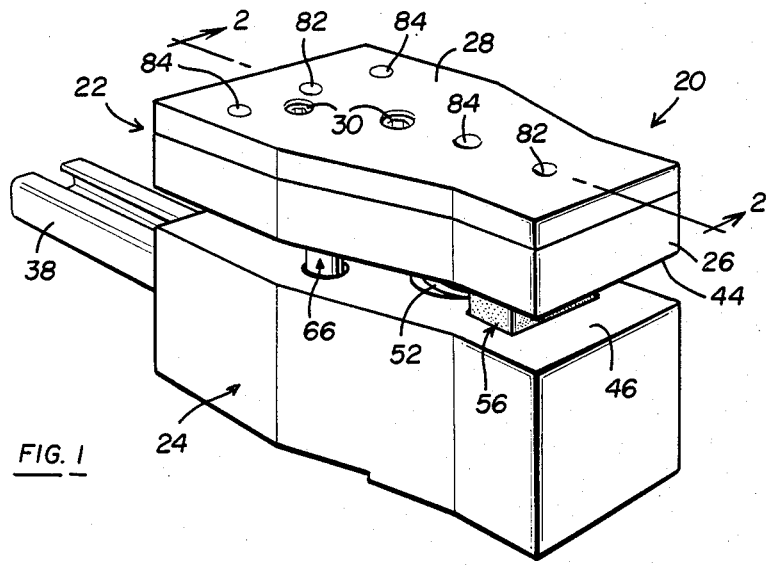
FIG. 1 is a perspective side elevation of one embodiment of the fastener installation apparatus of this invention.

As described above, the fastener installation apparatus or head 20 includes a stationary housing member 22, which may be secured to a die shoe or member and a moveable housing member 24. In the disclosed embodiment, the stationary housing member includes a base plate 26 and a hardened back-up plate 28, the function of which is described hereinbelow. The base plate 26 and back-up plate 28 are secured together by any suitable means, including screws 30.

The moveable housing member 24, which may be formed from a single block of metal, includes a first passage or nut passage 32 and a transverse intersecting plunger passage 34. The first passage 32 includes an enlarged rectangular opening 36, coaxially aligned with the nut passage, which receives a plastic chute 38 which is secured in place by set screws 40. As shown, the screws 40 are threaded into the sides of the plastic chute retaining the chute against accidental removal.

As described above, the fastener installation apparatus of this invention is particularly adapted to install self-piercing fasteners, such as the pierce nuts disclosed in U.S. Pat. No. 3,648,747, the disclosure of which is incorporated herein by reference. Pierce nuts of this type may be supplied in strip form, wherein the fasteners are interconnected by frangible connector means such as wires as disclosed in U.S. Pat. No. 3,711,931. The fasteners are received in the first passage 32 of the installation head 20 through a flexible chute 38. A separate nut feed mechanism may be provided or the nuts may be fed by gravity. As described above, however, the fastener installation head of this invention may also be utilized to feed other pierce or clinch nuts, including the T-shaped pierce nut disclosed in U.S. Pat. No. 3,152,628. Also, the nuts may be supplied to the head in bulk or loose form. The plastic chute 38 and first passage 32 are internally configured to receive the self-piercing fasteners to be installed by the installation head.

The plunger passage 34 is preferably perpendicular to the nut passage 32 and terminates in an enlarged clearance opening 42 as described hereinbelow. The opposed surfaces of the stationary housing member and the moveable housing member, 44 and 46, respectively, are preferably flat and include coaxially aligned cylindrical openings, 48 and 50, respectively, which receive a compression coil spring 52. The coil spring is resiliently biased between the members to normally separate the members, as shown. It will be understood, however, that other spring means may be utilized to perform the same function.

Figure 4:
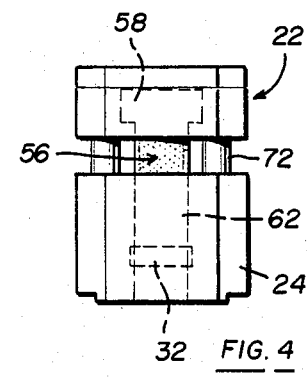
FIG. 4 is an end view of the embodiment of the fastener installation shown in FIG. 1.

The preferred embodiment of the fastener installation apparatus of this invention includes an integral T-shaped plunger 56. The plunger includes a rectangular head portion 58 (see FIG. 4) which is received in a slot or opening 60 in the base plate 26, and an enlongated leg portion 62 which is telescopically received in the plunger passage 34.

Figure 2:
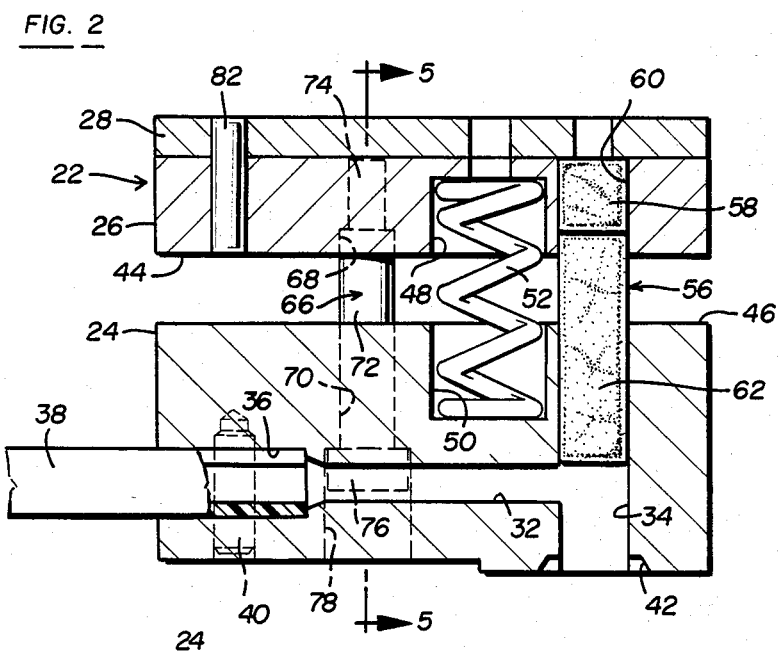
FIG. 2 is a side partially cross-sectioned view of the fastener installation apparatus shown in FIG. 1 in the direction of view arrows 2—2.
Figure 5:
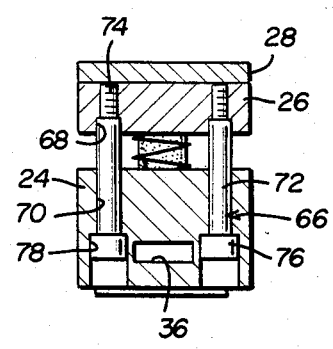
FIG. 5 is a cross-sectional view of the fastener installation apparatus as shown in FIG. 2, in the direction of view arrows 5—5.

The moveable member 24 is supported and guided on the base plate 26 for reciprocating motion by two guide bolts 66. As shown in FIGS. 2 and 5, each of the guide bolts is received in coaxially aligned bores in the stationary and moveable housing members, 68 and 70, respectively. The guide bolts each include a cylindrical shank portion 72 having a threaded end portion 74 which is threadably received in a threaded counter-bore in the base plate 26. Each of the guide bolts include an enlarged head portion 76 which is telescopically received in an enlarged cylindrical counter-bore 78 in the moveable housing member 24.

As described above, installation heads for self-piercing fasteners are generally incorporated in a die press assembly, wherein the pierce nut is installed in a panel and the panel may be simultaneously formed by the die press. The stationary housing member 22 is therefore attached to a die shoe, platen or die member, not shown. In the disclosed embodiment, for example, the stationary die member 22 may be attached to a moveable die member in a press assembly. Locating holes 82 are provided in the stationary die member for receipt of locating dowels. The locating dowels are received in the die shoe to accurately locate the installation head relative to the clinching die, as described below. In the disclosed embodiment, the stationary die member is provided with three threaded bores 84 for attachment of the stationary die member to a die shoe.

Figure 3:
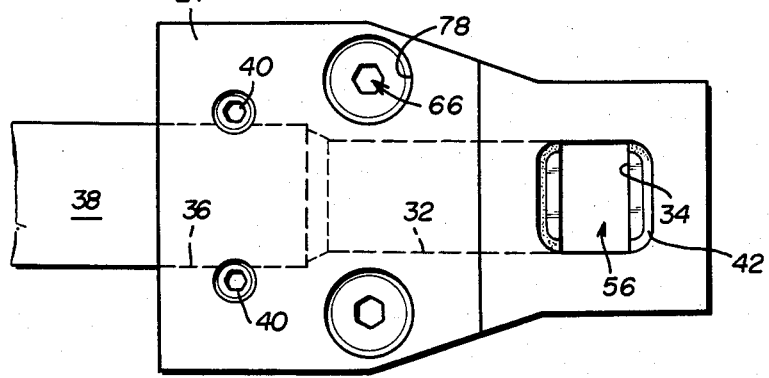
FIG. 3 is a bottom view of the fastener installation head shown in FIG. 1.

The operation of the disclosed embodiment of the installation head is as follows. Self-piercing fasteners are received in the first passage 32 through plastic chute 38. A self-piercing fastener is thus received beneath the plunger 62 in the plunger passage 34. A separate retainer means for the end fastner may be provided as disclosed in U.S. Pat. No. 3,946,478 where the nuts are received in bulk form. A support means is not required where the nuts are interconnected by frangible connector means as described above. As shown in FIG. 2, the leg portion 62 of the plunger extends into the plunger passage 34, adjacent the intersection of the nut and plunger passages when the housing members are fully separated by the spring 52. In the disclosed embodiment, the leg portion 62 of the plunger is rectangular as shown in FIG. 3 and the plunger passage 34 is rectangular to closely receive the plunger.

A self-piercing fastener is received in the plunger passage 34, beneath the plunger 56, with the piercing pilot facing the panel, not shown. As described in the above-referenced patents, the panel is normally supported on a clinching die opposite the plunger passage. The clinching die has a rectangular opening, coaxially aligned with the plunger passage which receives the pilot of the pierce nut and the slug punched from the panel. The clinching die may also include clinching lips or upstanding flanges which deform the panel into locking grooves provided in the nut.

When the die press assembly is closed, the moveable housing member 24 first engages the panel, stopping relative movement between the housing member 24 and the panel. Where the stationary member 22 is attached to the moveable die member of the die assembly, the stationary member 22 continues to move toward the panel, telescoping the plunger 56 and the supported pierce nut in the plunger passage 34 until the pierce nut engages the panel. The pierce nut then pierces a slug from the panel and the nut is simultaneously installed in the panel, in one stroke of the die press assembly. It will be understood, however, that the panel may be supported in the moveable die member, in which case the panel is moved toward the head assembly 20 until the panel engages the moveable die member 24. Continued movement of the die member moves the moveable member 24 toward the stationary member 22, telescoping the plunger 56 and the supported nut in the plunger passage 34 to install a nut in the panel. Where the nuts are interconnected by frangible connector means in a nut strip, the initial movement of the plunger strips the end nut from the strip. The next nut is then received beneath the plunger upon opening of the dye press assembly. The clearance opening 42 receives the panel metal forced upward, passed the nonclinched sides of the nut, during installation.

The moveable die member 24 may be formed from a single block of metal having perpendicular passages 32 and 34, as described. This construction eliminates the requirement for complex metal castings which may be subject to failure. The moveable member 24 is supported for reciprocating motion on the stationary member by guide bolts 66. As best shown in FIG. 3, the axes of the guide bolts 66 are spaced equidistant from the axis of the plunger 56. The guide bolts are preferably spaced apart as far as possible to support and guide the moveable housing member. In the most preferred embodiment, the distance between the axes of the guide bolts is approximately equal to the distance between the guide bolts and the plunger, providing balanced support for the moveable housing member.

The installation apparatus of this invention may be relatively small when compared to the installation apparatus disclosed in the prior art. For example, a commercial embodiment of the disclosed installation head is 3.63 inches long and 2.25 inches wide at its broadest point. The width of the head assembly portion including the plunger is only 1.5 inches, permitting use of the fastener installation head in tight locations in the die assembly. The height of the die assembly, measured in the axis of the plunger leg, is 2.5 inches closed and 3 inches when the moveable member is fully separated from the stationary member, as shown in FIG. 2.

The installation head may be easily disassembled by unthreading the guide bolts 66. The plunger is removed by removing the back-up plate 28. The plastic chute 38 is removed by removing set screws 40. The simplified design of the disclosed embodiment therefore has many advantages over the more complex designs disclosed in the prior art. The installation head of this invention is therefore relatively simple, yet rugged in construction. Further, the assembly is relatively small and compact, increasing the applications for pierce nuts. It will be understood, however, that various modifications may be made to the disclosed fastener installation apparatus of this invention within the purview of the appended claims, which follow.

I claim:

1. An apparatus for installing a self-attaching fastener on a panel, said apparatus having a stationary member for attachment to a die member and a relatively moveable member connected to said stationary member, said moveable member having a first passage for receiving self-piercing fasteners and a transverse plunger passage intersecting said first passage, a plunger connected to said stationary member and projecting therefrom into said moveable member plunger passage, spring means resiliently biased between said members, and spaced guide bolts generally parallel to and spaced equidistant from said plunger received in parallel coaxially aligned bores in said stationary and moveable members, the connection between said relatively moveable member and said stationary member consisting essentially of said guide bolts, said guide bolts being fastened at one end to said stationary member and having an enlarged head portion disposed in a counterbore in said moveable member, said guide bolts supporting and permitting limited movement of said moveable member relative to said stationary member against the reaction of said spring means parallel to the axis of said plunger, said guide bolts and said plunger cooperating to guide the movement of said moveable member relative to said stationary member.

2. The apparatus for installing a self-attaching fastener defined in claim 1, characterized in that said plunger is T-shaped having a head portion retained in a slot in and bearing against said stationary member and an elongated leg portion telescopically received in said moveable member plunger passage.

3. The apparatus for installing a self-attaching nut defined in claim 2, characterized in that said stationary member is a metal plate and said moveable member is formed from a single pierce metal block, said members having opposed aligned cylindrical openings receiving a compression coil spring, said coil spring providing said spring means.

4. The apparatus for installing a self-attaching fastener defined in claim 3, characterized in that said plunger passage includes an elongated rectangular opening which receives a plastic chute receiving self-attaching fasteners for installation by said apparatus, said chute retained in said opening by retainer screws received through said moveable member block which are threaded into the sides of said chute, releaseably retaining said chute in said moveable member opening.

5. An apparatus for installing self-attaching metal fasteners in a panel, said fasteners each having a projecting pilot portion for piercing an opening in a panel and a groove retaining the fastener in the pierced panel opening, said apparatus comprising a stationary base member for attachment to a die member and a relatively moveable member connected to said stationary base member, said members having mating engaging faces, said moveable member having a first passage configured to receive said self-attaching fasteners and a transverse plunger passage intersecting said first passage, said plunger passage opening into said mating faces and extending through said moveable member, a generally T-shaped plunger having a head portion retained in a opening in said base member and an elongated leg portion projecting from said base portion mating face into said plunger passage in telescopic relation, a compression spring located between said member mating faces resiliently biasing said moveable member from said stationary base member, and a pair of spaced guide means generally parallel to and equidistant from said plunger permitting limited movement of said moveable member relative to said stationary member, the connection between said moveable member and said stationary base member consisting essentially of said spaced guide means, the movement of said moveable member relative to said stationary base member being guided essentially only by said spaced guide means and said plunger, said first passage receiving self-attaching fasteners beneath said plunger, said plunger installing said fasteners in a panel supported opposite said plunger passage upon movement of said moveable member relative to said stationary base member.

6. The apparatus for installing self-attaching fasteners defined in claim 5, characterized in that said base member is a metal plate and said moveable member is a single piece generally rectangular metal block having generally perpendicular intersecting passages defining said first and plunger passages, and said member mating faces being generally flat and having opposed openings receiving said compression spring.

7. The apparatus for installing self-attaching fasteners defined in claim 6, characterized in that said pair of guide means are bolts received in spaced parallel bores coaxially aligned in said base and moveable members, said bolts each having a threaded end portion threadably attached to said base member and an enlarged head portion received in an elongated counterbore in said moveable member, said bolts permitting limited movement of said moveable member relative to said base member against the compression of said spring, said spring being disposed between said plunger and each of said bolts.

8. The apparatus for installing self-attaching metal fasteners defined in claim 6, characterized in that said first passage has a rectangular opening in the wall of said moveable member and said apparatus including a plastic chute delivering self-attaching fasteners to said first passage releaseably retained in said first passage opening, said chute retained by threaded fasteners threadably received through said moveable member and threaded into the sides of said chute, releaseably retaining said chute.

* * * * *